Aug. 27, 1940.　　　　H. T. HULSCHER　　　　2,212,938
FOLDABLE DEVICE
Filed July 29, 1938　　　5 Sheets-Sheet 3
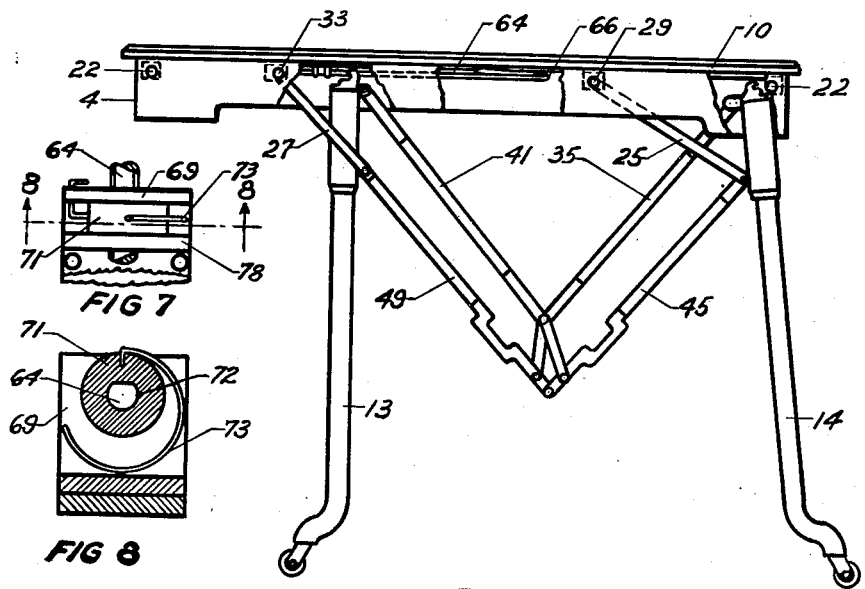
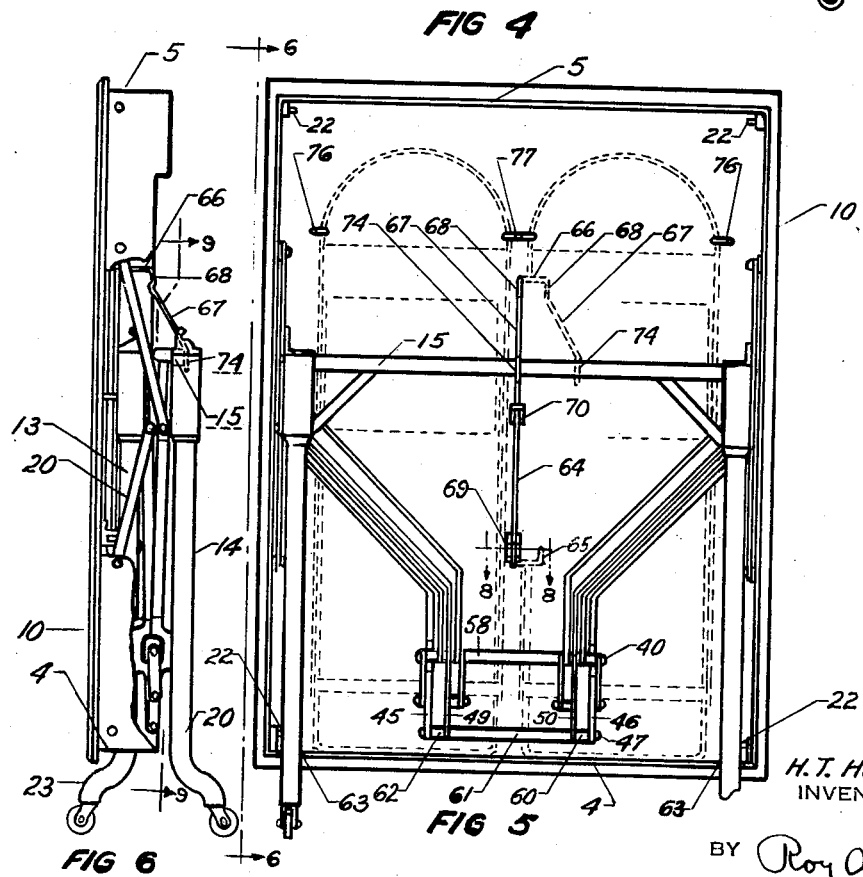
H. T. HULSCHER
INVENTOR
BY Roy A. Plant
ATTORNEY Aug. 27, 1940.                H. T. HULSCHER                2,212,938
                               FOLDABLE DEVICE
                           Filed July 29, 1938           5 Sheets-Sheet 4

H. T. HULSCHER
INVENTOR

BY Roy A. Plant
ATTORNEY

Aug. 27, 1940.  H. T. HULSCHER  2,212,938
FOLDABLE DEVICE
Filed July 29, 1938  5 Sheets-Sheet 5
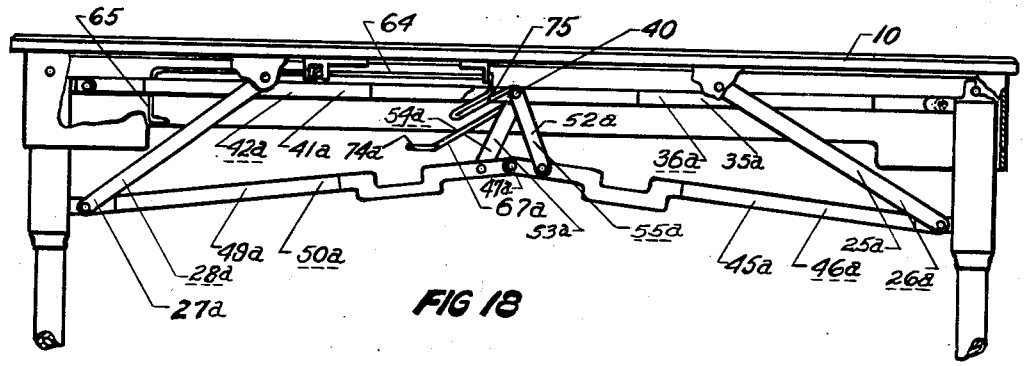
FIG 18
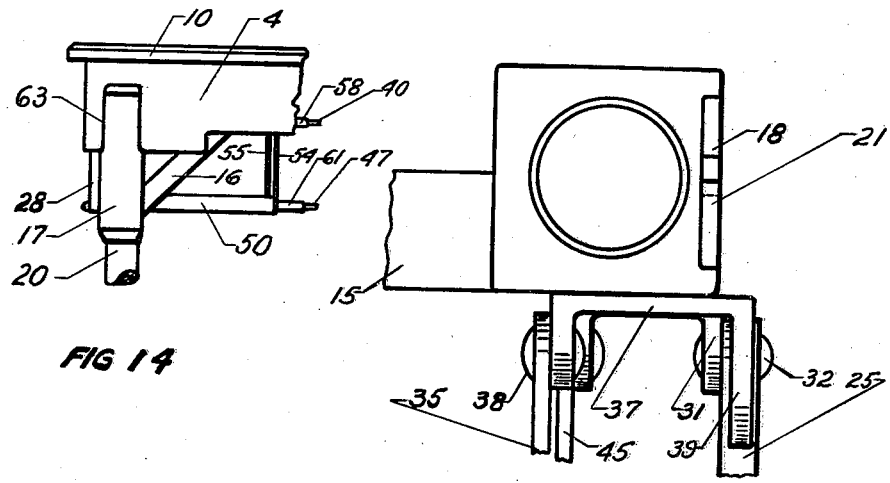
FIG 14
FIG 15
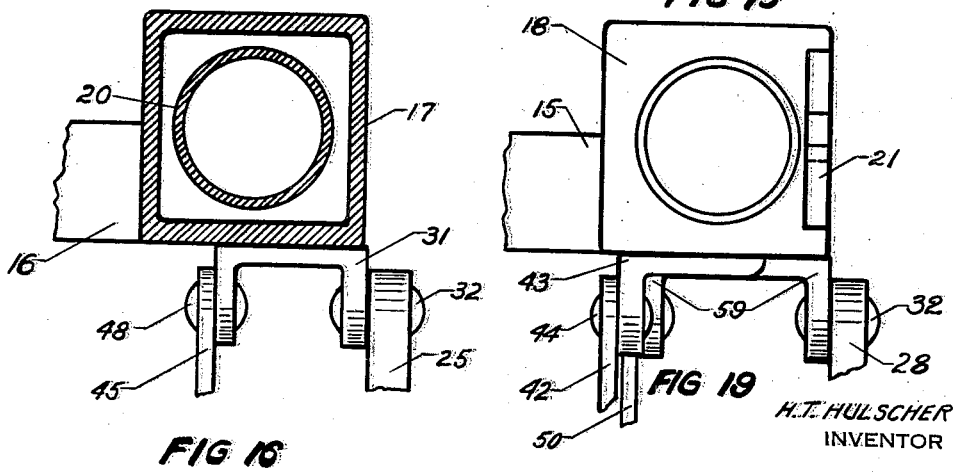
FIG 16
FIG 19
H. T. HULSCHER
INVENTOR
BY Roy A. Plant
ATTORNEY Patented Aug. 27, 1940

2,212,938

UNITED STATES PATENT OFFICE 2,212,938

FOLDABLE DEVICE

Harold T. Hulscher, Battle Creek, Mich.

Application July 29, 1938, Serial No. 221,889

11 Claims. (Cl. 311—80)

The present invention relates broadly to devices having folding mechanisms, and in its specific phases relates to a folding table.

Accordingly, among the objects of the present invention is the provision of a folding table having legs which fold in pairs, such legs being pivotally fastened with knee brace links to opposite sides of the table top near but spaced from the ends thereof in manner permitting the table top to be turned from horizontal position to substantially vertical position parallel to the legs.

Still further objects and advantages of the invention will appear from the following description which brings out not only the joining of the table legs in pairs, by means of knee brace links, to opposite sides of the table top, but the coupling of the pairs of legs together by means of a toggle linkage having upper and lower links which, in combination with the knee brace links, holds the legs in substantially parallel position during folding and unfolding of the table in manner permitting the bottom of the legs to continuously contact the floor during such operation and balance and support the table top at the same time.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways in which the principle of the invention may be used.

In said annexed drawings:

Figure 4 shows a succeeding step in the operation of folding the table.

Figure 5 shows a back view of the table in completely folded position.

Figure 6 is an edge view of the table in folded position with part of the side rail broken away, and as viewed along the line 6—6 of Figure 5.

Figure 7 shows the mechanism for rotating the locking hook of the table sidewise against the under face of the table top as shown in dotted lines in Figure 5.

Figure 8 is a sectional view of the rotating mechanism for the locking hook as viewed along the lines 8—8 of Figures 5 and 7.

Figure 14 shows a partial end view of the table as viewed along line 14—14 of Figure 2.

Figure 15 shows an end view of one of the table legs as viewed along the line 15—15 of Figure 9.

Figure 16 shows a partially sectioned view of one of the table legs as viewed along the line 16—16 of Figure 9.

Figure 17 shows a top view of the toggle linkage of the table as viewed from the top of Figure 1.

Figure 18 shows a modified form of the table of the present invention illustrating the use of a snap locking toggle mechanism.

Figure 19 shows a top view of the back leg of the pair of legs 13 as seen in Figure 1.

Figure 1:
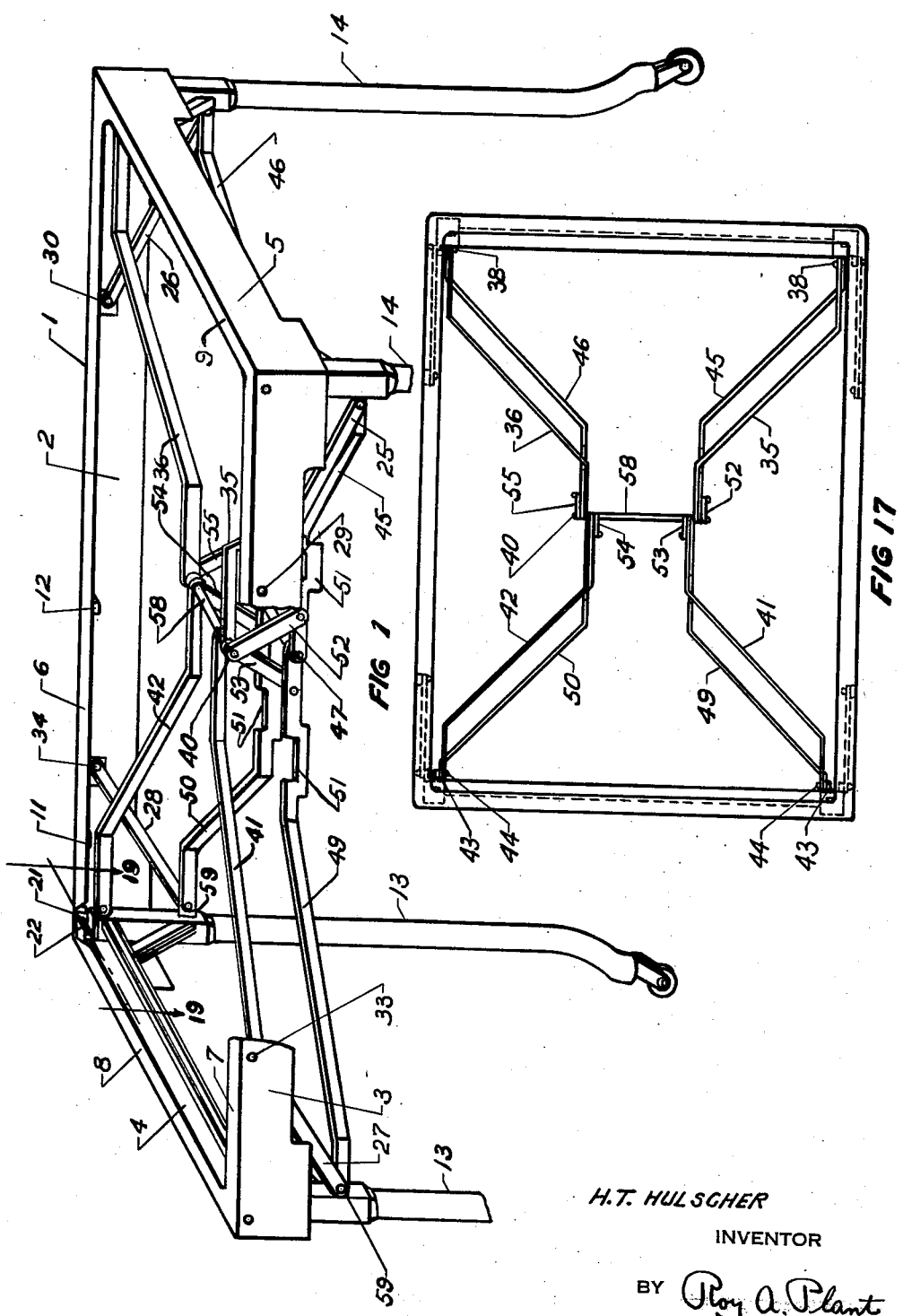
Figure 1 shows a perspective view of one form of the present invention with some parts removed and others broken away.

Referring more particularly to the drawings, the table in preferred construction has a top frame 1 (Figure 1) formed with side rails 2 and 3 and end rails 4 and 5. The upper edge of the side rails 2 and 3 is preferably provided with flanges 6 and 7, while the end rails 4 and 5 are likewise preferably provided with flanges 8 and 9. These flanges act not only to stiffen the top frame of the table, but also are usable for anchoring the table top 10 in place. The flanges 6 and 7 also carry bumpers 11 and 12 which may be made of rubber or other suitable material. These bumpers contact the side of one pair of legs to hold same in preferred spaced relation to the under face of the table top when same is folded, and yet such bumpers in preferred construction do not extend back to side rails 2 and 3. This leaves room for the upper end of hooks 21 on pair of legs 13 to slide on the under face of flanges 6 and 7 during part of the folding operation.

Figure 9:
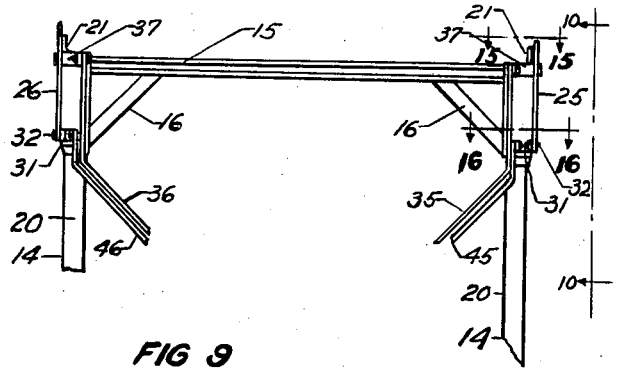
Figure 9 shows an assembly view of one pair of legs as viewed along the line 9—9 of Figure 6.

The table legs are assembled in pairs 13 and 14. As shown in Figure 9 in connection with pair of legs 14, each pair of legs are joined together by means of a crossbar 15 which is preferably in the form of a channel having its open face looking toward the underside of the table. This permits welding of the crossbar 15 to the legs inside of the channel where the weld will not show without looking at it from the underside of the table. The crossbar 15 may, however, be made of a tubular member, rod, or angle, if desired, and the showing in the drawings is to be considered as diagrammatic of the many forms of construction usable for this purpose.

To stiffen the pairs of legs, suitable knee braces 16 are preferably used as shown in Figure 9. In preferred form, these knee braces are of channel construction, with the channel opening downwardly. This permits welding the ends of the knee braces in place with the weld inside of the ends of same where it is concealed from casual observation.

The individual legs of the pairs 13 and 14 may be constructed in various ways without departing from the spirit and obvious scope of the present invention. One simple construction involves the use of a square tubular head member 17 (Figure 10) having an angle member 18 welded to the upper end thereof, and a bottom member 19 welded to the bottom end thereof. Members 18 and 19 are provided with openings adapted to receive leg 20 which, in preferred construction, has a close sliding fit with the opening through bottom member 19 and passes upward into the opening of angle member 18 where it is welded or otherwise suitably fastened in place.

The angle member 18 has a hook end 21 adapted to engage a suitable pin 22 attached to the top frame 1 of the table. These hook ends 21 and pins 22 cooperate when the table is in the unfolded or set up position shown in Figures 1, 2, and 18 to hold the table legs and table top against separation in case the table top is lifted upward for any reason whatsoever.

Figure 13:
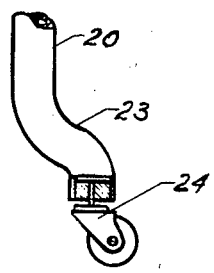
Figure 13 shows a partially sectioned view of the castor end of one of the legs.

To provide adequate support for the table during the folding and after the folding is completed, it is preferable to provide the individual legs 20 with an offset 23, as shown in Figure 13. To increase the ease of folding the table, the lower end of the legs may be provided with swivel castors 24 of conventional construction, but preferably of the trailing type shown.

Figure 10:
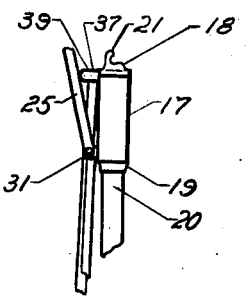
Figure 10 shows an end view of one pair of legs as viewed along the line 10—10 of Figure 9.

The pairs of legs 13 and 14 are joined to the top frame 1 by means of knee brace links 25, 26, 27, and 28. The upper ends of knee brace links 25 and 26 are pivotally mounted on pivot pins 29 and 30. The lower ends of knee brace links 25 and 26 are mounted on brackets 31 which are joined to the individual table legs as shown in Figures 9 and 10. An enlarged sectional view of the right-hand table leg of Figure 9 with bracket 31 and knee brace link 25 in place is shown in Figure 16. The connecting of the knee brace links to the brackets 31 is accomplished through the use of suitable pivot pins 32. The knee brace links 27 and 28 are mounted at their upper ends on pivot pins 33 and 34, while the lower ends of these knee brace links are preferably pivotally mounted on brackets 59 in similar manner to knee brace links 25 and 26. An enlarged view showing bracket 59 mounted on the back leg of the pair of legs 13 of Figure 1 is shown in Figure 19.

The movement of the pairs of legs 13 and 14 relative to the table top 10 is accomplished through the agency of a suitable toggle linkage which will now be described. This toggle linkage consists, in general, of upper link members and lower link members suitably joined at a point approximately under the center of the table by means of suitable short links and pivot members. Referring to Figures 1 and 17, it will be noted that the toggle linkage is formed from bent link members so as to place the central pivots well under the table at a point where they will normally be out of sight. Upper links 35 and 36 are pivotally joined by means of pivots 38 to brackets 37 (Figure 15) which in turn are attached to the upper ends of the individual legs of the pair of legs 14, as shown in Figures 9 and 10. The right-hand bracket 37, as shown in Figure 15, is provided with a projecting bumper member 39 adapted to contact the edge of knee brace link 25 (Figure 10) during the table folding operation and hold the pair of legs 14 in substantially upright position during part of the folding and also when the folding is completed. Bracket 37 on the left-hand leg, as shown in Figure 9, is mounted in reverse position to that shown in Figure 15 so that the projecting bumper member 39 will contact the edge of knee brace link 26 in similar manner to that described in connection with the contacting of knee brace link 25. The opposite or free ends of upper links 35 and 36 are mounted on pivot rod 40. The other pair of upper links 41 and 42 are likewise connected at one end to pivot rod 40 and at the other end to bracket 43 (Figure 19) by means of pivot members 44. The angle brackets 43 do not extend past the outer edge of the legs, and hence permit knee brace links 27 and 28 to swing past the side of the pair of legs 13, as is shown in Figure 4.

The lower links 45 and 46 are mounted at their free end on a pivot rod 47 and at the other end on brackets 31 (Figure 16) by means of pivot members 48 as shown in connection with link 45. Lower link 46 is connected to a bracket 31 in similar manner to lower link 45 except that the bracket is inverted, as is shown in Figure 9.

Lower links 49 and 50 are also mounted at their free end on pivot rod 47 and at the other end on brackets 59 (Figures 1 and 19) so as to permit the table to fold to the positions shown in Figures 5 and 6. The brackets 59 are inverted to each other the same as brackets 31 shown in Figure 9. The lower links 45, 46, 49, and 50 are preferably provided with offset portions 51 of conventional construction, to provide clearance for the linkage when folded.

The upper links 35, 36, 41, and 42 are joined to the lower links 45, 46, 49, and 50 by means of short connecting links 52, 53, 54, and 55. All of these short connecting links are mounted at one end on pivot rod 40, as shown in Figure 1. The lower end of link 52 is pivotally connected to lower link 45, the lower end of link 53 is pivotally connected to lower link 49, the lower end of link 54 is pivotally connected to lower link 50, and the lower end of link 55 is pivotally connected to lower link 46.

Figure 12:
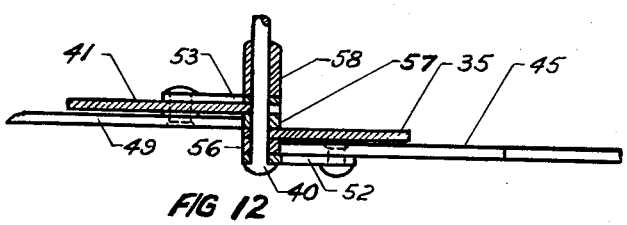
Figure 12 shows a partially sectional view of part of the toggle linkage as viewed along the line 12—12 of Figure 11.
Figure 11:
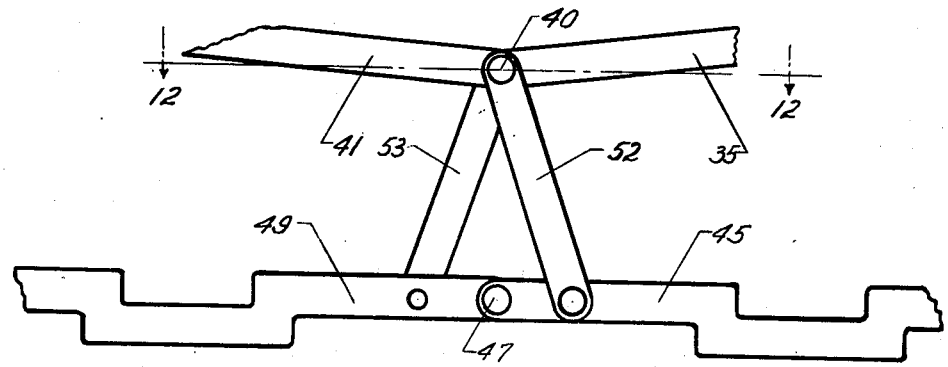
Figure 11 shows in enlarged front detail the central portion of the toggle linkage illustrated in Figure 2.

To properly space the various links pivotally connected to pivot rod 40 in manner avoiding interference at this point during folding, link 52 is separated from upper link 35 by means of a space washer 56 (Figure 12). The inner pivot end of upper link 35 is separated from the inner pivot end of upper link 41 by means of space washer 57, and links 53 and 54 are separated at their pivot end preferably by means of a sleeve-type spacer 58. As shown in Figures 5 and 17, upper links 36 and 42 are separated at their inner pivot end by means of a space washer which is the same as space washer 57 shown in Figure 12. Upper link 36 is separated from link 55 by means of a space washer which is the same as space washer 56. The connections of the various links on pivot rod 40 are symmetrical, and hence to avoid duplication of showing, Figure 12 has been drawn to illustrate in enlarged view only the connections to one end of pivot rod 40.

As shown in Figure 5, the lower pivot rod 47 is provided with a spacer 60 between lower links 46 and 50. A sleeve-like spacer 61 is preferably provided on pivot rod 47 between lower links 49 and 50. A spacer 62 is likewise placed on pivot rod 47 between the lower links 45 and 49. The various spacers on pivot rods 40 and 47 are used to hold the toggle linkage in suitable spaced relation to permit folding to the position shown in Figure 5 and 6. The brackets 31, 37, 43, and 59, which are mounted on the individual legs, are also of such a size and location that they facilitate the folding and unfolding of the table without interference between the various parts of the linkage. As shown in the drawings, the various links are pivoted and formed so that they will fold to the position shown in Figures 5 and 6 without interference with each other. The knee brace links and toggle linkage also act together as a unit when the table is folded and unfolded. To permit the individual legs 20 of the pair of legs 13 to fold to the position shown in Figure 6, it is necessary to provide end rail 4 with a notched-out portion 63 at each end. The details of one of these notches are shown in Figure 14 and the general location of the two notches in Figure 5.

Figure 2:
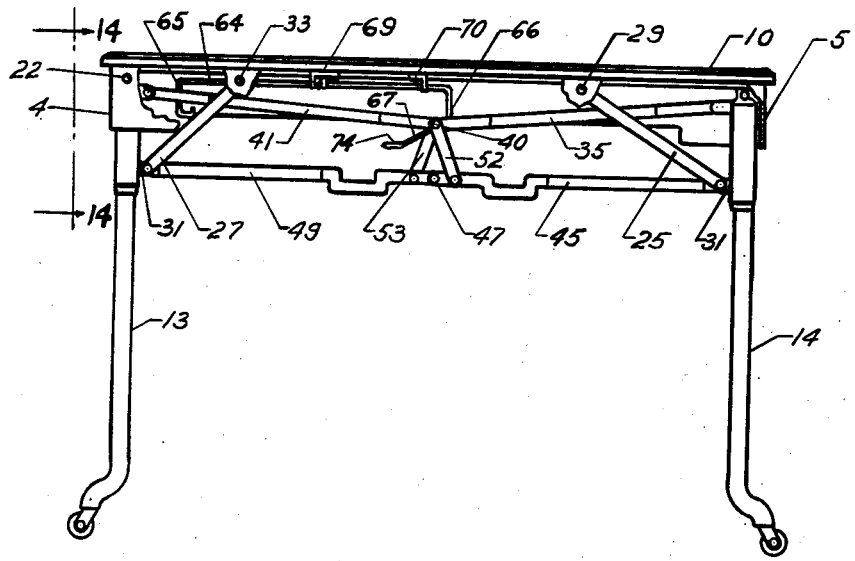
Figure 2 shows a side view of one form of the present invention as set up, but with a portion of the side rail broken away to show some of the hidden parts of the mechanism.

To hold the toggle linkage against folding movement when the table is set up as shown in Figure 2, a suitable latching mechanism is provided. One preferred construction of this mechanism involves the use of an endwise slidable rod 64 having a handle 65 at one end and a latch hook 66 at the other end. This latch hook in preferred construction has an inclined member 67 adapted to engage spacer 58 on pivot rod 40 when endwise slidable rod 64 is slid to the left as viewed in Figure 2. This endwise movement lifts the center portion of the toggle linkage to the position shown in Figure 2 where spacer 58 rests on shoulder 68 which eliminates any tendency for the rod 64 to accidentally slide to the right and hence permit the toggle mechanism to become released and ready for folding. Supporting members 69 and 70 (Figures 2 and 5) for rod 64 are, in preferred construction, attached to the underface of table top 10. In order to rotate endwise slidable rod 64 up against the under face of the table top 10 where it will be out of the way when the table is to be folded or the like, a sleeve 71 (Figures 7 and 8) having an opening 72 therethrough is mounted on rod 64 between the end of supporting member 69 and bracket 78 in manner permitting rod 64 to slide therethrough. Rod 64 and opening 72 preferably have a flattened side, or the equivalent, which will cause sleeve 71 to rotate in unison with rod 64. A spring 73 is connected to sleeve 71 and supporting member 69 so as to exert tension adapted to rotate slidable rod 64 to the position shown in dotted lines in Figure 5 when same is slid to the right as viewed in Figure 2 and released. The latch hook 66 is also preferably provided with a flattened end 74 adapted to grip crossbar 15 of the pair of legs 14 when the table has been folded as shown in Figures 5 and 6. Gripping in this manner holds the table firmly in folded position until rod 64 has been slid upward to release the mechanism for unfolding.

In preferred construction all of the short connecting links 52, 53, 54, and 55 are of the same length from center to center of pivots. The upper links 35, 36, 41, and 42 are all of the same length from pivot to pivot as viewed on a vertical plane such as is shown in Figure 2. The lower links 45, 46, 49, and 50 are also of the same length from pivot to pivot as viewed in Figure 2. The pair of knee brace links 25 and 26 are both of the same pivotal length and the pair of knee brace links 27 and 28 are of the same pivotal length. The individual pairs of knee brace links, however, are not necessarily of the same length, and the particular length used in preferred construction will be such as to permit the table to fold to the position shown in Figure 6.

Figure 3:
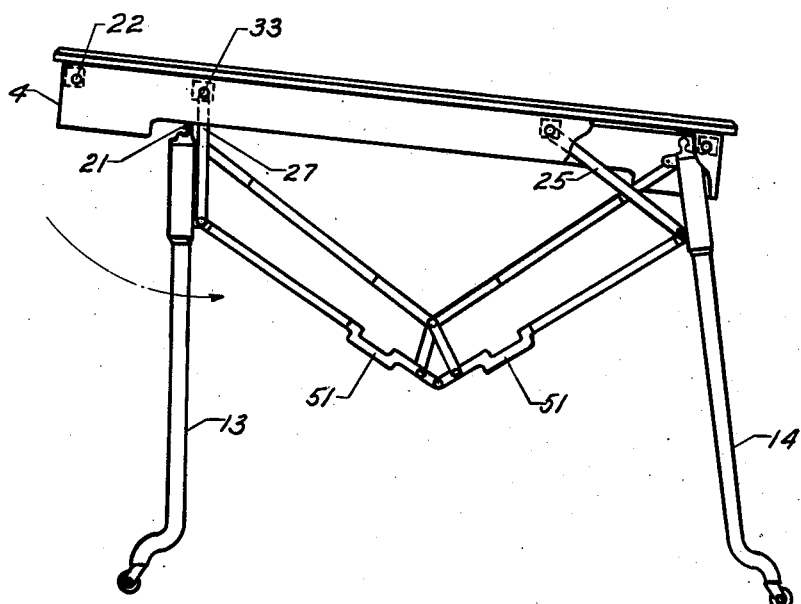
Figure 3 shows one step in the operation of folding the table.

With the table in the set up or unfolded position shown in Figure 2, the folding of same is accomplished as follows: Endwise slidable rod 64 is slid to the right as viewed in Figure 2 until the latch hook 66 completely clears sleeve 58 on pivot rod 40. Upon releasing the handle 65, spring 73 with its connecting mechanism will rotate rod 64 with latch hook 66 and handle 65 up against the under face of the table top 10 where it will be out of the way. At the same time, the center portion of the toggle linkage, due to its weight, will drop slightly and release hooks 21 on the upper end of the pair of legs 13 from locking engagement with pins 22. By taking hold of the end rail 4 and lifting up on same, the pair of legs 13 will swing inward on knee brace links 27 and 28 in the direction shown by the arrow in Figure 3. The pull of gravity on the toggle linkage will also aid in this swinging movement of the pair of legs 13 and when same have passed under pivots 33 and 34 at the upper end of knee brace links 27 and 28, then end rail 4 may be lowered and the pair of legs 13 will move to the right to the position shown in Figure 4. Then by pressing downward on the table top 10 over end rail 4, the pair of legs 14 will swing inward on knee brace links 25 and 26 while the upper edge of hooks 21 on angle member 18 of the pair of legs 13 will slide along the under faces of flanges 6 and 7 of the side rails 2 and 3. Continued movement of the table top in the same direction will carry it to the position shown in Figures 5 and 6. The table may then be locked in this folded position by moving the latching mechanism so that the flattened end 74 of latch hook 66 engages crossbar 15, as shown in Figure 6, and in solid lines in Figure 5. It is to be noted at this point that throughout the folding of the table, the legs at all times rest on the floor and carry and balance the weight of the table so that there is no danger of its tipping over.

The opening of the table is accomplished in the following manner: The latch hook 66 is first released from locking engagement with crossbar 15. Pressure is then applied to turn the table top 10 from vertical to horizontal position, and this may be started either by pushing backward and downward at end rail 5 (Figure 6) or by lifting out and upward at end rail 4. This will swing the pairs of legs 13 and 14 to the position shown in Figure 4. Then by lifting up on the table top at end rail 4, the pair of legs 13 will swing forward on knee brace links 27 and 28, and when they have been manually or mechanically carried past pivots 33 and 34, end rails 4 may be lowered, thus carrying the pair of legs 13 to the left end of the table. The inclined member 67 of the locking mechanism is then brought into contact with sleeve 58 on pivot rod 40 and by pulling endwise on latching handle 65, the toggle mechanism will be elevated and brought to rest with sleeve 58 on shoulder 68 of latch hook 66, thus locking the table in the unfolded position shown in Figure 2.

When it is desired to have a snap locking toggle mechanism, this may be accomplished in the manner shown in Figure 18. In this case the upper links 35a, 36a, 41a, and 42a are made slightly shorter than the corresponding links shown in Figure 2. The lower links 45a, 46a, 49a, and 50a are made slightly longer than the corresponding links of the mechanism shown in Figure 2. With this construction, when the toggle linkage is moved upward toward the position shown in Figure 18, the springing of the linkage as it passes dead center will cause it to snap upward near the end of its travel and hence be self-locking. Under these conditions, if the user in setting up the table will reach under same and lift the toggle mechanism up until it snaps into place, and also is willing to reach under the table and snap it downward when he wishes to fold the table, then a separate locking mechanism may be dispensed with, so far as concerns holding the table in set up condition. It is usually more convenient, however, to use a latching mechanism similar to that heretofore described with the exception that the hook end is of modified construction. The modified hook end preferably has the usual flattened end 74a for holding the table in folded position. It also has an inclined member 67a for contacting sleeve 58 on pivot pin 40 to elevate the toggle mechanism until it snaps into locked position when handle 65 is pulled to the left as viewed in Figure 18. To unlock the mechanism, the hook end of the latching mechanism is provided with a second inclined member 75. The movement of handle 65 to the right forces inclined member 75 into contact with sleeve 58 on pivot member 40 and thus forces the toggle linkage downward until it snaps to unlatched position, whereupon the handle 65 may be still further pushed to the right so that flattened end 74a will clear sleeve 58 and permit the hook to be folded up against the under face of the table top where it will be out of the way for subsequent folding steps.

With a 42 inch length table having a snap locking toggle mechanism, as shown in Figure 18, the preferred length for the various links and spacing of certain other parts are as follows: The knee brace links 27a and 28a are $8\frac{35}{64}$ inches long from center to center of pivots. Knee brace links 25a and 26a are $11^{27}/_{64}$ inches long from center to center of pivots. Upper links 35a, 36a, 41a, and 42a are $17\frac{15}{16}$ inches long from center line to center line of the pivots at the end of each link as taken on a plane perpendicular to said center lines and lengthwise of the table. Lower links 45a, 46a, 49a, and 50a are 17.992 inches from center line to center line of the pivots at the end of each link taken on said perpendicular plane. The short connecting links 52a, 53a, 54a, and 55a are $3\frac{7}{16}$ inches long from center to center of the pivots of each link. The center line of the pivot of the lower end of each of these short connecting links at the point where it is joined to the lower links is $1\frac{3}{16}$ inches from the center line of pivot rod 41a. The center lines of the pivots for the upper and lower links at the leg end thereof are $4\frac{11}{16}$ inches apart. By using links of these lengths and spacings, with suitable brackets and other parts joined thereto as shown, a snap locking toggle mechanism table of the type shown in Figure 18 may be readily constructed.

To facilitate maximum conservation of space, folding chairs may be used with this folding table. These chairs may be folded and mounted on the back of the table as is shown in dotted lines in Figure 5. Suitable brackets 76 and a button-type holder 77, or the equivalent thereof, may be used to hold the chairs in place.

Other modes of applying the principle of my invention may be employed instead of those explained, change being made as regards the mechanisms herein disclosed, provided the means stated by any of the following claims or the equivalent of such stated means be employed.

I therefore particularly point out and distinctly claim as my invention:

1. In a folding device of the character described, the combination of a top member, two pairs of legs, each pair being adapted for movement in unison, a pair of knee brace links for each pair of legs, means for pivotally connecting one end of each of said knee brace links to said top member, means for pivotally connecting the other end of each of said knee brace links to said legs, and a folding toggle linkage having upper and lower links pivotally joined to both pairs of legs.

2. In a folding device of the character described, the combination of a top member, two pairs of legs, each pair being joined together for movement in unison, a pair of knee brace links for each pair of legs, means for pivotally connecting one end of each of said knee brace links to said top member, means for pivotally connecting the other end of each of said knee brace links to said legs, a folding toggle linkage having upper and lower links pivotally joined to both pairs of legs, anchoring means at each end of said top member, and means on each pair of legs adapted to coact with said anchoring means on the top member to hold said top member and pairs of legs in fixed position only when said folding device is set up in completely unfolded position.

3. In a folding device of the character described, the combination of a top member, two pairs of legs, each pair being joined together for movement in unison, a pair of rigid knee brace links for each pair of legs, means for pivotally connecting one end of each of said knee brace links to said top member, means for pivotally connecting the other end of each of said knee brace links to said legs, a folding toggle linkage having upper and lower links pivotally joined to both pairs of legs, anchoring means at each end of said top member, means on each pair of legs adapted to coact with said anchoring means on the top member to hold said top member and pairs of legs in fixed position only when said folding device is set up in completely unfolded position, and means for stabilizing the folding device when unfolded, said stabilizing means including a holding member for locking said toggle linkage in place when said folding device is in completely unfolded position.

4. In a folding table adapted to have its top swung from horizontal to vertical position while continuously supported and balanced on its legs which remain standing substantially upright and automatically approach each other in pairs during such movement of the top, an upper and lower link containing toggle mechanism which pivotally joins said pairs of legs together, and holds same substantially upright while they move together in pairs as said table top is moved from horizontal to vertical position, each of said upper and lower links having a fixed location pivot on said legs, and each pair of said legs having both upper and lower links, all of said upper and lower links being pivotally joined intermediate of said pairs of legs for folding and toggle action.

5. In a folding table adapted to have its top swung from horizontal to vertical position while continuously supported and balanced on its legs which remain standing substantially upright and automatically approach each other in pairs during such movement of the top, the combination which comprises rigid knee brace links for pivotally connecting said pairs of legs to said top, and a toggle mechanism pivotally joined to said pairs of legs so as to hold same substantially upright and move same together in pairs as said table top is moved from horizontal to vertical position, said toggle mechanism comprising upper and lower links, each link being connected at one end to one pair of said legs, and each of said upper and lower links being pivotally connected together at their other end to permit toggle action.

6. In a folding table adapted to have its top swung from horizontal to vertical position while continuously supported and balanced on its legs which remain standing substantially upright and approach each other in pairs during such movement of the top, the combination which comprises knee brace links for pivotally connecting said pairs of legs to said top, and a toggle mechanism pivotally joined to said pairs of legs so as to hold same substantially upright and move same together in pairs as said table top is moved from horizontal to vertical position, said toggle mechanism comprising a pair of upper link members and a pair of lower link members pivotally connected to one pair of said legs, a pair of upper link members and a pair of lower link members pivotally connected to a different pair of said legs, the free ends of both pairs of upper link members being pivotally connected with a common center line, the free ends of both pairs of lower link members being pivotally connected with a common center line, said center lines being parallel to each other, and four short connecting link members, the upper end of each being pivotally mounted with a common center line which coincides with that of the upper link members, the lower ends of said short connecting link members being pivotally connected to said lower link members at a point adjacent but substantially spaced from the pivotal common center line of said lower link members, there being but one of said short connecting link members connected to each lower link member.

7. A folding table adapted to be continuously supported and balanced on its legs during folding and unfolding, which comprises a table top assembly, a pair of table legs at each end of said table top assembly, a rigid knee brace link for each leg, each of said knee brace links being pivotally joined to the table top assembly and also pivotally joined to a leg intermediate of the ends of the latter, means at each end of the table top assembly for holding the legs in fixed relative position and attached to the table top assembly only when the table is completely unfolded, and a toggle linkage comprising upper and lower links for each pair of legs, said upper and lower links being pivotally connected together at one end for toggle action, and pivotally connected at the other end to said legs and adapted to move the latter in pairs relative to each other with the legs remaining in substantially upright position as the table top assembly is moved relative to said legs and pivots on said knee brace links.

8. A folding table adapted to be continuously supported and balanced on its legs during folding and unfolding, which comprises a table top assembly, a pair of table legs at each end of said table top assembly, a rigid knee brace link for each leg, each of said knee brace links being pivotally joined to the table top assembly intermediate of its ends and also pivotally joined to a leg at a point near but substantially spaced from the upper end thereof, the knee brace links connected to a pair of legs are of uniform length, are connected to each leg of the pair the same distance from its upper end and also to the table top assembly a uniform distance from the end thereof adjacent said pair of legs, means for holding the table top assembly and legs in fixed position relative to each other only when the table is completely unfolded, part of said means being mounted on the upper end of the legs and part on the table top assembly, and a toggle linkage comprising upper and lower links for each pair of legs, said upper links being pivotally connected together with a common pivotal center line, said lower links being pivotally connected together with a common pivotal center line, and short links pivotally joining said upper and lower links for toggle action, the other end of each of said upper and lower links being pivotally connected to said legs and adapted to move the latter in pairs relative to each other with the legs remaining in substantially upright position as the table top assembly is moved relative to said legs and pivots on said knee brace links.

9. A folding table adapted to be continuously supported and balanced on its legs during folding and unfolding, which comprises a table top assembly, a pair of table legs at each end of said table top assembly, a knee brace link for each leg, each of said knee brace links being pivotally joined to the table top assembly intermediate of its ends and also pivotally joined to a leg at a point near but substantially spaced from the upper end thereof, the knee brace links connected to a pair of legs are of uniform length, are connected to each leg of the pair the same distance from its upper end and also to the table top assembly a uniform distance from the end thereof adjacent said pair of legs, means for holding the table top assembly and legs in fixed position when the table is completely unfolded, part of said means being mounted on the upper end of the legs and part on the table top assembly, and a toggle linkage connected to said legs and adapted to move said legs in pairs relative to each other in substantially upright position while the table top assembly is moved relative to said legs as they pivot on said knee brace links, said toggle mechanism comprising a pair of upper link members and a pair of lower link members pivotally connected to one pair of said legs, a pair of upper link members and a pair of lower link members pivotally connected to a different pair of said legs, the free ends of both pairs of upper link members being pivotally connected with a common center line, the free ends of both pairs of lower link members being pivotally connected with a common center line, said center lines being parallel to each other, and four short connecting link members, the upper end of each being pivotally mounted with a common center line which coincides with that of the upper link members, the lower ends of said short connecting link members being pivotally connected to said lower link members at a point adjacent but substantially spaced from the pivotal common center line of said lower link members, there being but one of said short connecting link members connected to each lower link member.

10. A folding table adapted to be continuously supported and balanced on its legs during folding and unfolding, which comprises a table top assembly, a pair of table legs at each end of said table top assembly, a knee brace link for each leg, each of said knee brace links being pivotally joined to the table top assembly intermediate of its ends and also pivotally joined to a leg at a point near but substantially spaced from the upper end thereof, the knee brace links connected to a pair of legs are of uniform length, are connected to each leg of the pair the same distance from its upper end and also to the table top assembly a uniform distance from the end thereof adjacent said pair of legs, a projecting bumper for at least one knee brace link, said bumper being mounted on only one pair of said legs, means for holding the table top assembly and legs in fixed position when the table is completely unfolded, part of said means being mounted on the upper end of the legs and part on the table top assembly, a toggle linkage connected to said legs and adapted to move said legs in pairs relative to each other in substantially upright position while the table top assembly is moved relative to said legs as they pivot on said knee brace links, said toggle mechanism comprising a pair of upper link members and a pair of lower link members pivotally connected to one pair of said legs, a pair of upper link members and a pair of lower link members pivotally connected to a different pair of said legs, the free ends of both pairs of upper link members being pivotally connected with a common center line, the free ends of both pairs of lower link members being pivotally connected with a common center line, said center lines being parallel to each other, and four short connecting link members, the upper end of each being pivotally mounted with a common center line which coincides with that of the upper link members, the lower ends of said short connecting link members being pivotally connected to said lower link members at a point adjacent but substantially spaced from the pivotal common center line of said lower link members, there being but one of said short connecting link members connected to each lower link member, and means including an endwise movable member with suitable supports and having an inclined portion adapted to engage the toggle linkage where the links join each other so as to move same and releasably lock the toggle linkage in manner holding the table top assembly and legs in fixed relation when the table is completely unfolded.

11. A folding table adapted to be continuously supported and balanced on its legs during folding and unfolding, which comprises a table top assembly, a pair of table legs at each end of said table top assembly, a rigid knee brace link for each leg, each of said knee brace links being pivotally joined to the table top assembly intermediate of its ends and also pivotally joined to a leg at a point near but substantially spaced from the upper end thereof, the knee brace links connected to a pair of legs are of uniform length, are connected to each leg of the pair the same distance from its upper end and also to the table top assembly a uniform distance from the end thereof adjacent said pair of legs, projecting bumpers for one pair of knee brace links, said bumpers being mounted only on one pair of legs and adjacent the upper end thereof, means for holding the table top assembly and legs in fixed position when the table is completely unfolded, part of said means being mounted on the upper end of the legs and part on the table top assembly, a toggle linkage connected to said legs and adapted to move said legs in pairs relative to each other in substantially upright position while the table top assembly is moved relative to said legs as they pivot on said knee brace links, said toggle mechanism comprising a pair of upper link members and a pair of lower link members pivotally connected to one pair of said legs, a pair of upper link members and a pair of lower link members pivotally connected to a different pair of said legs, the free ends of both pairs of upper link members being pivotally connected with a common center line, the free ends of both pairs of lower link members being pivotally connected with a common center line, said center lines being parallel to each other, and four short connecting link members, the upper end of each being pivotally mounted with a common center line which coincides with that of the upper link members, the lower ends of said short connecting link members being pivotally connected to said lower link members at a point adjacent but substantially spaced from the pivotal common center line of said lower link members, there being but one of said short connecting link members connected to each lower link member, a downwardly directed offset in each of the lower link members to provide clearance for the pivotal connection of the free ends of the upper link members when the toggle mechanism is in folded position, means including an endwise movable member with suitable supports and having an inclined portion adapted to engage the toggle linkage where the links join each other so as to move same and releasably lock the toggle linkage in manner holding the table top assembly and legs in fixed relation when the table is completely unfolded, means for releasably locking the whole table assembly when in folded position, the end of the table top assembly, which becomes the lowermost end when the table is folded, being constructed so as to not interfere with the complete folding of the table, and caster-mounted table legs which are flared at the bottom to provide adequate support for the table during folding and when completely folded.

HAROLD T. HULSCHER.